June 2, 1936.     W. K. SIMPSON     2,043,074
STEAM TRAP
Filed July 28, 1932     2 Sheets-Sheet 1
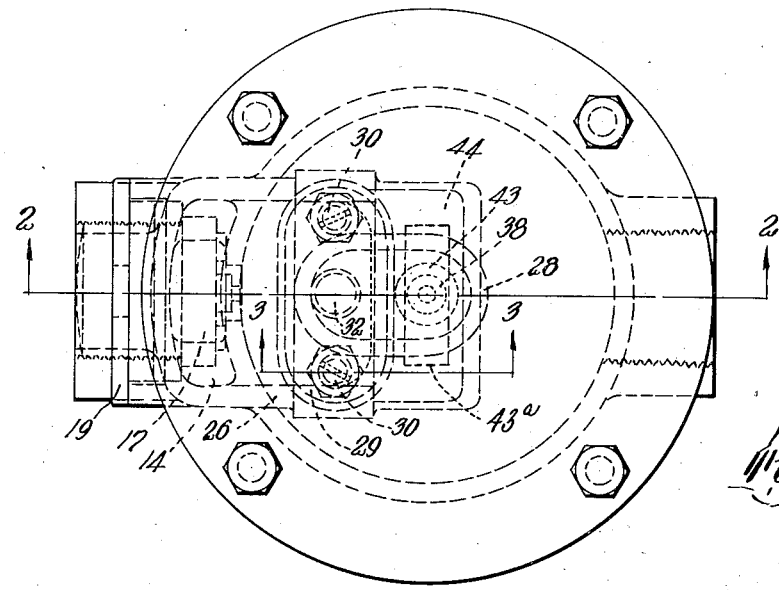
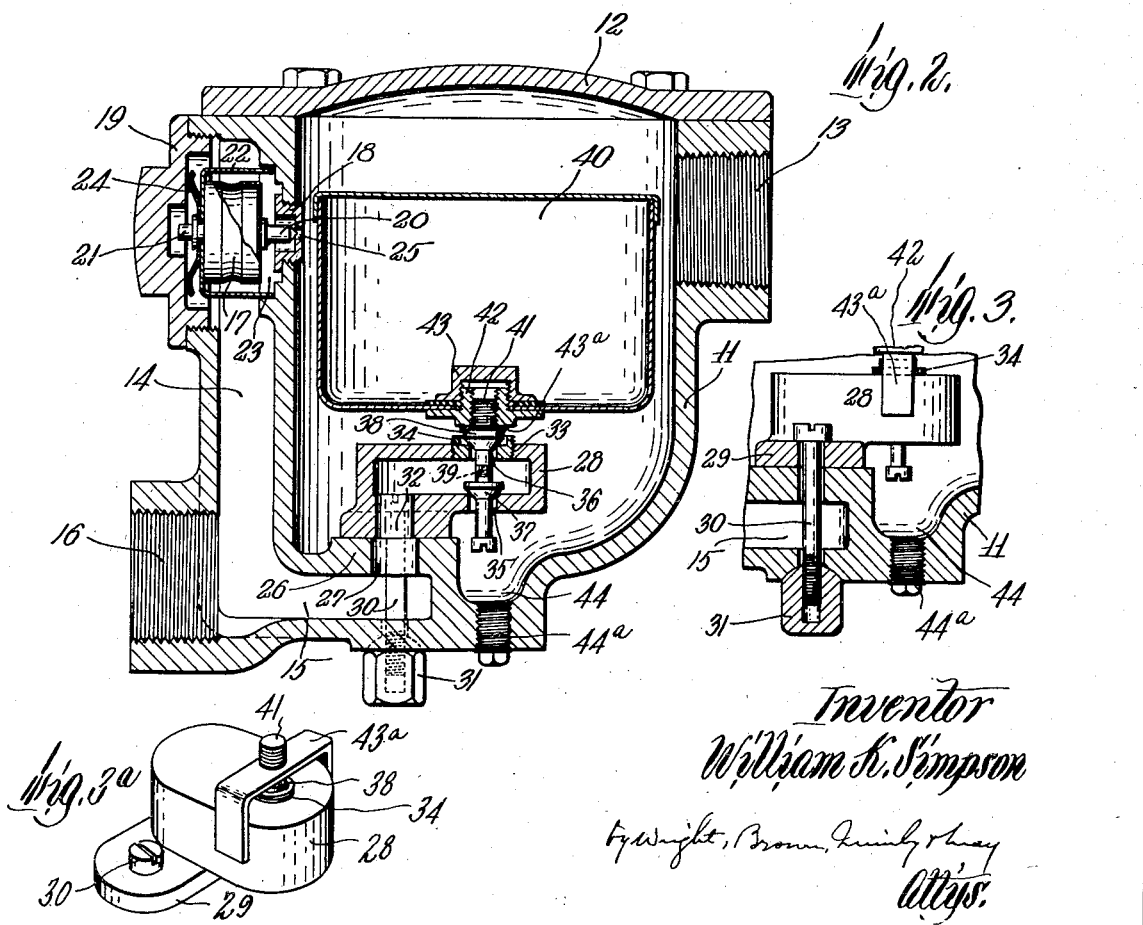
Inventor
William K. Simpson
By Wright, Brown, Quinby & May
Attys.

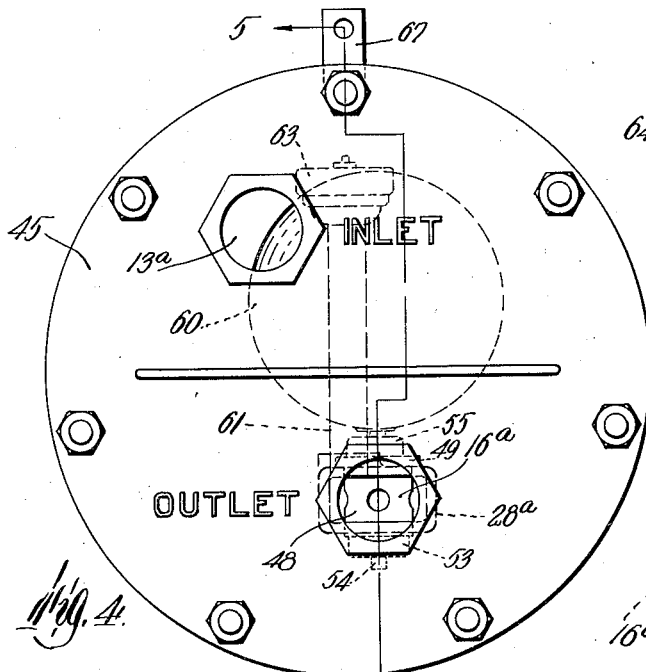
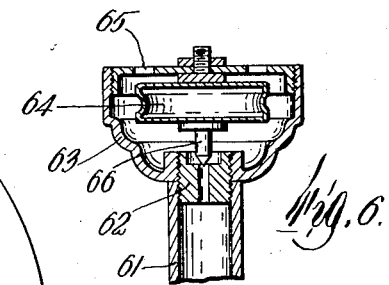
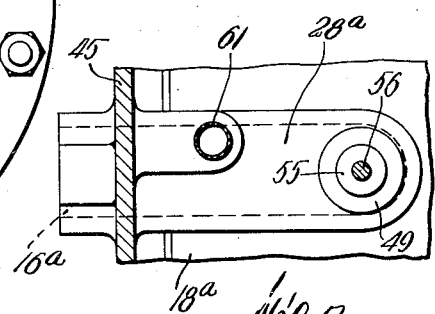
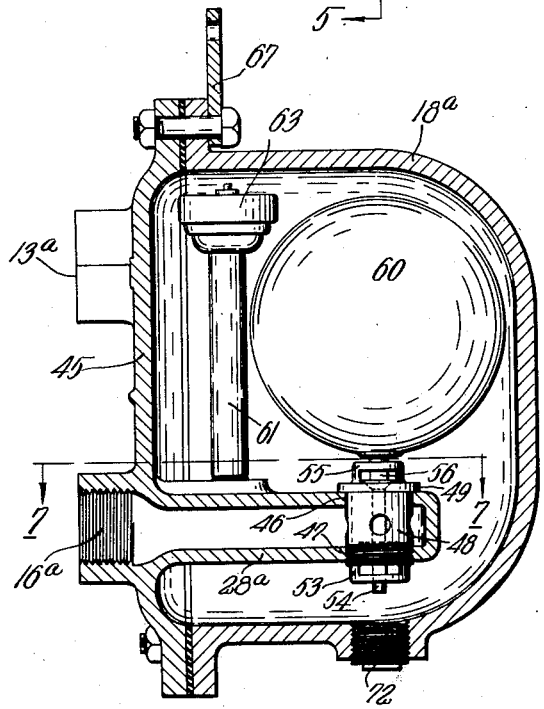
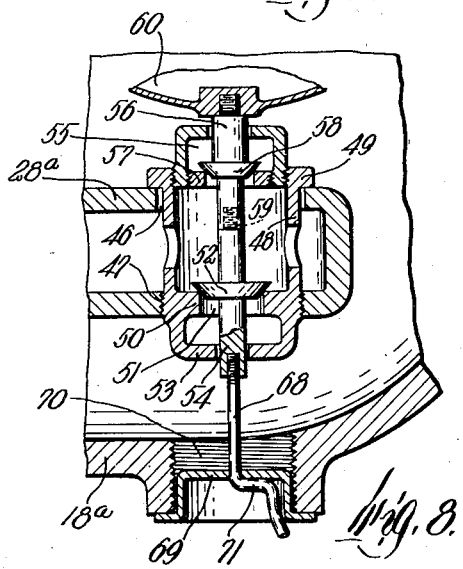

Patented June 2, 1936

2,043,074

UNITED STATES PATENT OFFICE 2,043,074

STEAM TRAP

William K. Simpson, Waterbury, Conn., assignor to Hoffman Specialty Company, Waterbury, Conn., a corporation of Illinois Application July 28, 1932, Serial No. 625,451

4 Claims. (Cl. 137—103)

This invention relates to traps for the separation of the air and water of condensation from steam, in steam heating systems and other situations where such a separation is called for. The main object of the invention is to produce an improved trap of this character which is simpler, and may be made more compact, than traps of the same class heretofore known, and of which the water discharge valve is operable with a minimum application of force. A corollary object is to furnish in such a trap a balanced discharge valve with means for adjustment whereby both elements of the balanced valve structure may be caused to close equally tightly. Another object is to combine the foregoing characteristics with thermostatic means for controlling the discharge of air from the trap. The invention consists in the novel and improved features hereinafter described and all equivalents thereof within the scope of the appended claims.

Two embodiments of the invention are here shown and described. One of them is designed more particularly for use with steam heating systems which operate at low pressures and is known commercially as a drip trap. The other is designed for heavier duty, to be used in situations where much higher steam pressures are employed, for instance pressures up to thirty pounds or more per square inch, and is called commercially a blast trap or heavy duty trap.

In the drawings,—

Fig. 1 is a plan view of the drip trap above referred to;

Fig. 2 is a vertical section of this trap taken on line 2—2 of Fig. 1;

Fig. 3 is a fragmentary vertical section taken on line 3—3 of Fig. 1;

Fig. 3a is a perspective view of the valve seat fitting;

Fig. 4 is a front elevation of the heavy duty or blast trap above referred to;

Fig. 5 is a vertical section of the latter trap taken on line 5—5 of Fig. 4;

Fig. 6 is a fragmentary sectional view of the thermostatic air vent valve and its mounting;

Fig. 7 is a fragmentary plan view in horizontal section taken on line 7—7 of Fig. 5;

Fig. 8 is a fragmentary sectional view of the water discharge valve and associated parts.

In the foregoing drawings the blast trap is shown in Figs. 4 and 5 on a relatively smaller scale than the representation of the drip trap in Figs. 1 and 2. As manufactured the blast trap is substantially larger and stronger than the drip trap.

The form of trap shown in Fig. 1 has a shell or casing 11 of substantially cylindrical form, adapted to be used with its axis upright. It is open at the upper end over which is placed and secured a cover 12. In one side near the top of the trap casing is a threaded opening 13 into which is screwed a part of the return line piping through which air, water of condensation, and exhaust steam flow from the radiators or pipe lines. In another part of the casing wall is a cored passage 14 having a branch 15 which extends partially into the bottom of the trap casing, and on the outside a tapped opening 16 into which the outlet pipe from the trap is screwed. The upper part of passage 14 is made wide enough to contain a thermostat 17; and through the inner wall of this passage there is a threaded opening in which is screwed a valve seat fitting 18. The wall which bounds the outer side of the passage is here made with a large enough opening to admit the thermostat, which opening is closed by a removable cap 19 screwed into it.

The thermostat is a drum having distensible end walls, to one of which the valve member 20 is secured, and the other one of which carries a stem 21 passing through and made fast to the end wall of a cage 22. This cage surrounds the thermostat and its rim is seated in a recess 23 formed in the partition wall between the passage 14 and the main chamber of the trap; while the outer end of the cage carries a spring 24 reacting against the cover 19, and holding the thermostat and cage assemblage in place. A vent port 25 is formed in the valve seat fitting 18 in line with valve 20 so as to be closed and opened by said valve as the thermostat expands and contracts.

The overlying wall 26 of the branch passage 15 is finished smooth on its top side, through which a port 27 opens, and supports a discharge valve fitting 28, in leakage tight contact with the finished under surface of the latter. The valve fitting 28 has lugs 29 at opposite sides through which bolts 30 pass. Said bolts also pass through the wall 26 and the bottom of the trap, and receive cap nuts 31 on their outer ends. The cap nuts have beveled faces which fit into tapered recesses in the bottom of the trap body and prevent leakage.

The valve seat fitting 28 has a port 32 in alinement with the port 27. It projects thence across the axis of the trap body where it overhangs the bottom of the trap. It has a tapped hole 33 in its top side which receives an adjustable screw threaded valve seat bushing 34, and a port 35 in its bottom wall alined with a port 36 in such bushing. Except for the ports 32 and 35, and the hole 33, the fitting 28 is an entirely enclosed hollow body.

A balanced discharge valve cooperates with the ports 35 and 36, having a disk or valve element 37 adapted to seat on the upper rim of the port 35, and a second valve disk or element 38 adapted to seat on the upper rim of port 36. These valve disks are each made, with associated stem extensions, as a separate piece from the other, and are screwed together, by a threaded extension 39 on one stem entering a socket in the other, to permit their assemblage with the bushing 34. The connected valve disks are secured to a float 40 by a threaded stem 41 projecting from the disk 38 and screwed into a nipple 42 which passes through the bottom of the float and receives a cap nut 43 on its external thread.

The float, valve units, and valve seat fitting are assembled together outside of the trap body or casing, with the bolts 30 driven tightly into the lugs 29 of the fitting and prevented by flutes in their sides from turning, and are inserted as a unit in the casing, the cover 12 being removed. In order to enable the bolts to be easily registered with the holes in the trap body at this time, I preferably employ means for preventing rotation of the valve fitting relatively to the float. Such means in the present illustration consists of a yoke 43a, through the middle of which the threaded stem 41 passes, and the extremities of which are turned down so as to embrace loosely the sides of the valve fitting. This yoke may be gripped between the valve disk 38 and the adjacent end of nipple 42. However, other means of attachment within the skill of the mechanic may be used for the same purpose.

When the trap is cold and empty of water, its parts take the position shown in Fig. 2, the balanced exhaust valve being closed and the thermostatic vent valve being open. When steam is turned into the system, air and water of condensation flow into the trap through the inlet 13 and air escapes through the vent 25, passage 14, and outlet 16. When enough water has accumulated to raise the float, discharge of water occurs through the ports 35, 36 and connecting passages and ports, to the outlet 16. When steam reaches the trap, or approaches so near it that its heat expands thermostat 17, the vent valve closes.

By virtue of the balanced construction of the discharge valve, the force needed to open it is a minimum. Thus it may be opened and closed by a float of small volume directly coupled with it; while the ports may be of any desired diameter without effect on the ability of the float to open the valve. The float indeed need have only enough buoyancy to support the weight of the valve and yoke, and lift them, besides overcoming what frictional resistance there may be to their rise. The permissible small size of the float and elimination of leverage for multiplying its force application on the valve, and the large possible size of the discharge ports, permit the trap to be made small and compact, while able to discharge a large volume of water. It combines maximum discharge capacity with minimum bulk, weight and cost.

The depression 44 in the bottom of the trap permits collection of scale and sediment which otherwise might interfere with the tight closing and proper operation of the valve. A cleanout hole in the bottom wall, closed by a removable plug 44a, enables such matter to be removed.

An important factor conducing to the results above explained is the adjustable valve seat bushing 34, the adjustment of which enables both valve disks to be seated simultaneously and with equal tightness, without difficult and extensive procedures of machining within minute limits of error, or tedious grinding of the valves on their seats.

The trap shown in Figs. 4–8 is essentially the same in principle as that just described and differs only in features of design and details of manufacture. Its body or shell 18a is open at one side and receives a cover 45 across the open side. In the upper part of the cover is an inlet opening 13a, and in its lower part an outlet opening 16a from which a hollow extension 28a, closed at the sides and inner end, runs well into the interior of the shell. This extension has alined holes 46 and 47, one of which is threaded, in its top and bottom sides, in which is placed a valve casing 48 which has a flange 49 to overlie the rim of hole 46. Ports in the sides of this casing open to the interior space of the extension 28a. In the lower part of the casing is a flange 50 surrounding a port 51 and containing a seat for a valve disk or element 52. Its lower extremity is made as a yoke 53, having a central hole for guiding the tail stem 54 of this valve unit, and being open at opposite sides for free flow of water. The upper end of the casing is open and receives in threaded connection with it a yoke 55 which guides stem 56, and is open at opposite sides. In the interior of the yoke 55 is adjustably screwed a valve seat ring or bushing 57 having a central port and a seat which cooperates with valve disk or element 58. The two valve elements are constructed separately and are detachably screwed together at 59 for assemblage. Stem 56 is screwed into a tapped hole in the bottom of a float 60.

This construction provides a balanced valve, of which both ports may be of the same area, or the lower port may be somewhat larger than the upper in order to assist the opening movement when the float rises, but not enough larger to open the valve when the full weight of the float rests on it, even when affected by the heaviest steam pressures under which the trap is used. Or, conversely, the upper port may be the larger if a stronger closing effect under pressure is desired. In principle, and to a considerable extent in detail also, it is identical with the balanced valve previously described; of which, also, the ports may be equal or unequal in area, as and for the purposes just explained. The term "balanced" as used to define the valves herein described is to be understood as including structures wherein the pressure acting on one valve element partially balances that acting on the other, as well as arrangements where the balance is exactly equal.

A thermostatic vent is provided for this trap also. It comprises a tube 61 threaded into a tapped hole in the top side of extension 28a and rising into the upper part of the trap above the highest water level of normal operating conditions. Such tube contains a valve seat bushing 62 in its upper end on which is mounted a cage 63 supporting a thermostat 64 and having openings 65 for flow of air. The thermostat in this case also is an expansible drum containing a volatile fluid, to one wall of which is secured a valve 66 for opening and closing the passageway through the bushing 62; and from the opposite wall projects a threaded stem which passes through the detachable cover of the cage and receives a clamp nut (Fig. 6).

The mode of operation and advantages of this trap are substantially the same as described in connection with the drip trap. It is provided with a spherical float instead of a cylindrical one to combine minimum weight with maximum strength to resist collapse under heavy fluid pressures.

A strap or bracket 67 is secured to the upper part of the trap by one of the bolts which holds the cover, and serves for the attachment of a chain, rod, etc. for supporting the weight of the trap when it is connected in a suspended pipe line.

The valve units and float (being the movable parts) of this trap are withheld from movement while the trap is being moved about in shipment, by a rod 68 screwed into a tapped hole in the end of valve stem 54 and passing thence through a hole in a plug cover 69 which is set into a tapped hole 70 in the trap bottom. The outer part of this rod is bent over against the outer side of the plug at 71. This prevents injury to the valve units and seats by vibration and careless handling in transit. When the trap is set up for use, the rod 68 and plug cover 69 are taken out and discarded. Hole 70 is then closed by a threaded plug 72, which may be removed when necessary to drain the trap and clean out sediment. In like manner the valve units of the trap shown in Fig. 2 may be held against their seats, for shipment, by substantially identical means; since the hole in the bottom of the trap (occupied by the removable plug 44a) is approximately in line with the lower valve stem extension. Thus a tension member equivalent to the rod 68 may be connected with said extension and interlocked with a temporary cover or the like, set in or over the clean out hole in substitution for the plug 44a.

What I claim and desire to secure by Letters Patent is:

1. A steam trap comprising a casing having inlet and outlet openings, a valve fitting, a balanced valve cooperating with said fitting, and a float connected to said balanced valve, all constituting a unit assemblage insertable as such into the casing and the fitting having a port to register with the outlet opening of the trap casing, means for securing said valve fitting in the casing, including parts in the fitting and casing which must first be brought into register, and means for preventing rotation of the fitting relatively to the valve in the course of entrance into and assemblage with the trap casing.

2. A steam trap as set forth in claim 1, in which the rotation preventing means comprises a yoke having a non-rotative engagement with the float, and members loosely embracing opposite sides of the fitting in a manner to prevent rotation while permitting free endwise movement of the float and valve relatively to the fitting.

3. A steam trap comprising a casing having an outlet in its lower part and a smooth finished surface surrounding said outlet, a fitting having a finished surface complemental to the first named finished surface and adapted to make fluid-tight contact therewith, said fitting having a hole to register with said outlet and being otherwise of closed hollow formation with alined ports in two walls which are opposite to one another; the casing and fitting having complemental fastening means for securing the fitting in place, a balanced valve cooperating with said port, and a float secured to said balanced valve; the float, valve, and fitting being a unit assemblage separate from the casing, adapted to be inserted in the casing as such.

4. A steam trap as set forth in claim 3 comprising further means for preventing relative rotation between the fitting on the one hand and the valve and float on the other hand when such unit assemblage is placed in the casing to be secured therein; such rotation-preventing means permitting opening and closing movements of the valve.

WILLIAM K. SIMPSON.